(12) United States Patent
De Jonge et al.

(10) Patent No.: US 7,918,189 B2
(45) Date of Patent: Apr. 5, 2011

(54) CATTLE HANDLING SYSTEM AND METHOD OF INSTALLING SAME

(75) Inventors: John H De Jonge, Abbotsford (CA); Brian A Cruson, Langley (CA)

(73) Assignee: Artex Barn Solutions, Abbotsford, British Columbia (CA)

( * ) Notice: Subject to any disclaimer, the term of this patent is extended or adjusted under 35 U.S.C. 154(b) by 0 days.

(21) Appl. No.: 12/345,588

(22) Filed: Dec. 29, 2008

(65) Prior Publication Data

US 2009/0183688 A1    Jul. 23, 2009

Related U.S. Application Data

(62) Division of application No. 10/272,712, filed on Oct. 16, 2002, now Pat. No. 7,469,659, which is a division of application No. 09/467,725, filed on Dec. 20, 1999, now Pat. No. 6,467,434.

(51) Int. Cl.
    *A01K 1/00*      (2006.01)
(52) U.S. Cl. ........................................................ 119/523

(58) Field of Classification Search .... 119/14.01–14.03, 119/520, 523, 416, 436; 248/59, 62, 68, 248/70, 514
See application file for complete search history.

(56) References Cited

U.S. PATENT DOCUMENTS

| | | | | |
|---|---|---|---|---|
| 2,880,949 | A * | 4/1959 | Fuss | 248/70 |
| 3,089,674 | A * | 5/1963 | Bastie | 248/514 |
| 3,162,407 | A * | 12/1964 | Yax | 248/514 |
| 4,413,799 | A * | 11/1983 | Gabriel | 248/59 |
| 4,650,164 | A * | 3/1987 | Shepherd | 256/68 |
| 6,038,829 | A * | 3/2000 | Franks | 52/645 |
| 7,059,590 | B2 * | 6/2006 | Bronstad | 256/13.1 |
| 7,484,697 | B1 * | 2/2009 | Nelson | 248/62 |

* cited by examiner

*Primary Examiner* — Thomas Price
(74) *Attorney, Agent, or Firm* — John Russell Uren

(57) ABSTRACT

A cattle handling system comprises a plurality of stall dividers positioned side by side and extending generally parallel to each other. Brackets for mounting the stall dividers are connected directly to a concrete slab and allow for connection of the stall dividers to the brackets in a one man operation without the need for embedding vertical members in the slab. The position of the brackets are located on the concrete slab by use of a mounting jig. The brackets may have a vertical adjustment allowing for an increase or decrease in the working height of the stall dividers.

14 Claims, 12 Drawing Sheets

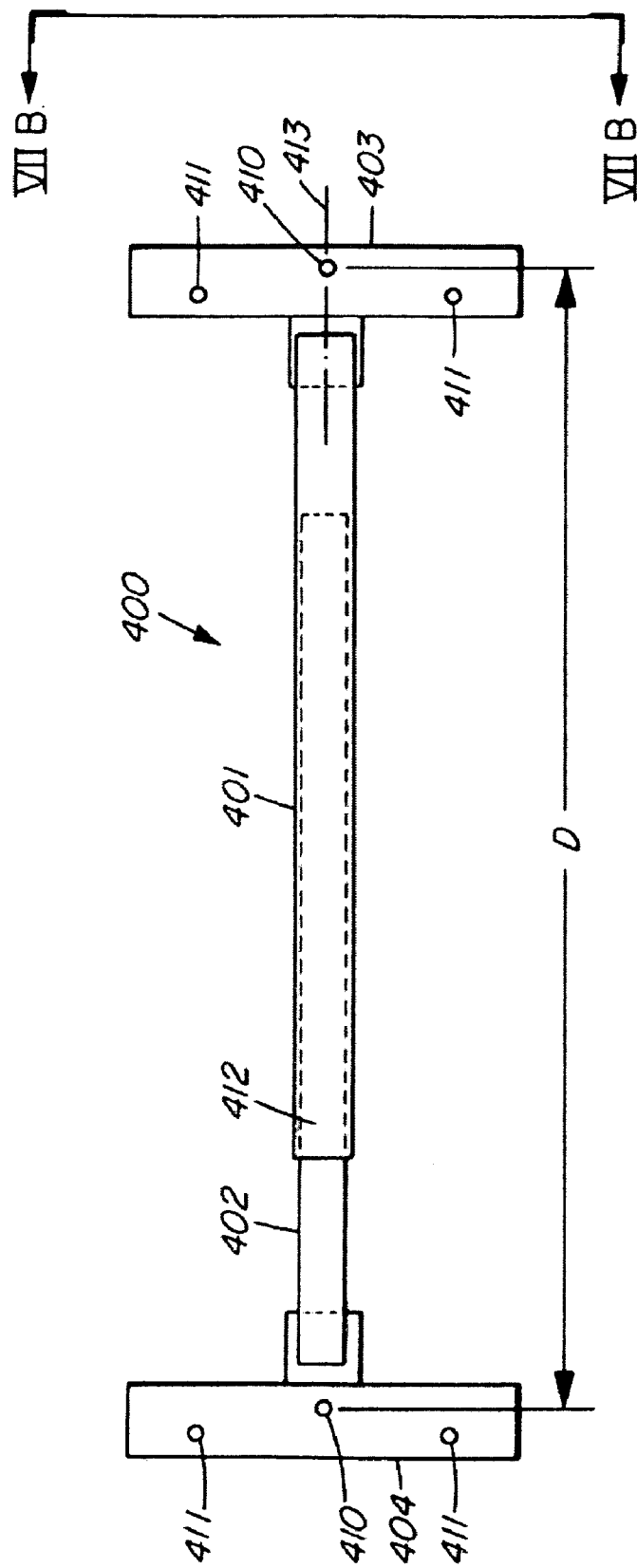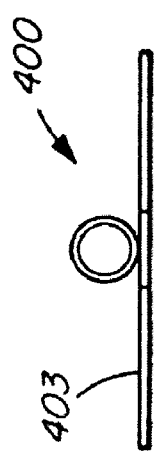
FIG. 7A
FIG. 7B

CATTLE HANDLING SYSTEM AND METHOD OF INSTALLING SAME

CROSS-REFERENCE TO RELATED APPLICATIONS

This application is a division of application Ser. No. 10/272,712 filed Oct. 16, 2002, now allowed, which was a division of application Ser. No. 09/467,725 filed Dec. 20, 1999, now issued as U.S. Pat. No. 6,467,434 and dated Oct. 22, 2002.

INTRODUCTION

This invention relates to a cattle handling system and, more particularly, to an improved cattle handling apparatus and method which are used for separating cattle stalls within a barn in order to allow for individual stalls.

BACKGROUND OF THE INVENTION

Typically, in dairy operations, cows are sheltered within a barn or a barn may be available in the event of inclement weather or otherwise. The cows may rest or may be fed and milked within the barn. A further area is generally provided for allowing the cows to rest if they are not eating. The rest area is divided into stalls to separate the resting cows. This prevents interference between the resting cows. The stalls are arranged on an elongate concrete slab which runs the length of the barn within which the cows are located and is of a width that allows the cows to stand or lie such that the manure from the resting cows is deposited outside the width of the elongate slab for convenience in manure gathering and disposition. The slab is covered with bedding of an appropriate nature, such as compost, hay, sawdust and the like which bedding is used to soften the bed for the cattle. The bedding is replaced from time to time to maintain cleanliness.

The installation of the stall dividers has previously been achieved by installing a vertical hollow metallic member, or a wood member, which member is positioned or embedded in the concrete slab when the concrete is initially poured or which is attached to the surface of the slab following the pouring operation. The vertical members are placed in the wet concrete a predetermined distance apart and are arranged to extend vertically so far as is possible. Following the installation of the vertical members and the drying and hardening of the concrete, brackets are mounted on the vertical members at desired vertical positions. The brackets allow for the insertion of the actual stall divider members themselves. The stall divider members extend generally normal to the longitudinal center line of the slab.

This prior art technique has disadvantages. First, it is time consuming for the contractor pouring the concrete slab to await the installation of the vertical members prior to or during the concrete pouring operation. Secondly, the vertical and horizontal positioning of the members is time consuming and difficult to maintain particularly during the pouring operation when the concrete is applying strong forces on the members thereby tending to change their positions. Although the vertical member, following installation, allows for vertical adjustment of the stall dividers, which vertical adjustment may be useful for cattle of different sizes, the presence of the posts permanently installed detracts from the otherwise clean presence of the flat concrete. Further, damage to the posts will always occur over time due to the severe operating conditions under which they are used, namely the movement of large cows which exerts significant forces against the stall dividers. Finally, there is no post installation flexibility once the posts are embedded in the concrete.

SUMMARY OF THE INVENTION

According to one aspect of the invention, there is provided a bracket used for installing a cattle stall divider in a barn or shelter which cattle stall divider extends generally horizontally and longitudinally and which acts as a divider for positioning an animal on each side of said cattle stall divider, said bracket comprising a first generally horizontal member for attachment to a slab or foundation within said barn or shelter and a second member associated with said first member and being located above said first member, said second member having an attachment area to allow the connection of a third member to said bracket which third member forms part of said cattle stall divider.

According to a further aspect of the invention, there is provided a bracket used for installing a cattle stall divider, said bracket comprising a first member for attachment to a slab or foundation and a second member associated with said first member and being located above said first member, said second member having an attachment to allow the connection of a third member.

According to still yet a further aspect of the invention, there is provided a bracket used for installing a cattle stall divider, said bracket being attachable to a slab or other foundation, said bracket comprising a first member attachable to said slab or foundation, a fourth member adjustable relative to said first member and a second member associated with said first and fourth members and being mounted to said fourth member above said attachment of said first member to said slab.

BRIEF DESCRIPTION OF THE SEVERAL VIEWS OF THE DRAWINGS

Specific embodiments of the invention will now be described, by way of example only, with the use of drawings in which:

FIGS. 7A and 7B are plan and end views, respectively, of the jig used to install the floor brackets according to yet a further aspect of the invention.

DESCRIPTION OF SPECIFIC EMBODIMENT

Figure 1A:
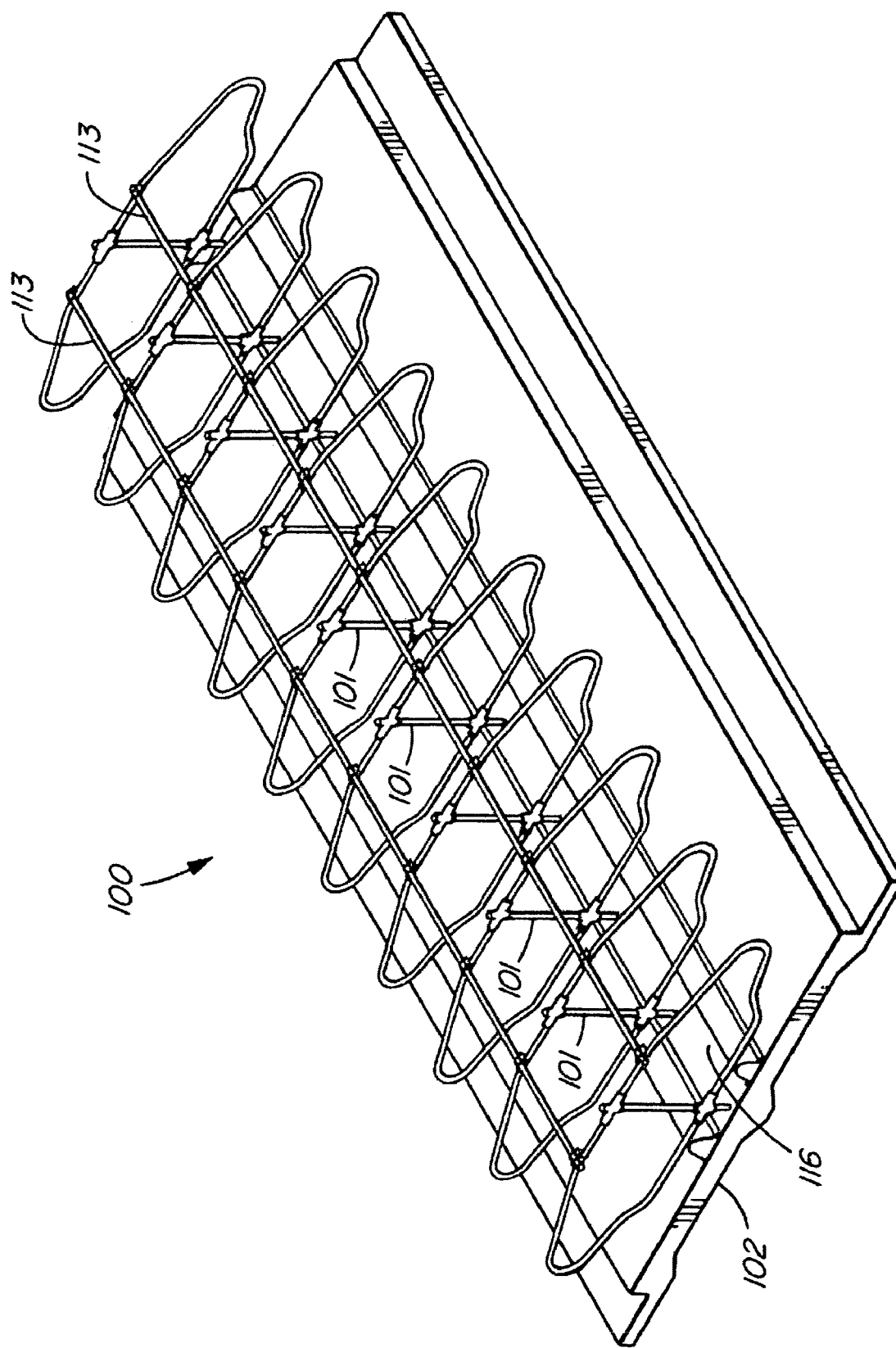
FIG. 1A is a diagrammatic isometric view of a cattle handling stall installation according to the prior art.
Figure 1B:
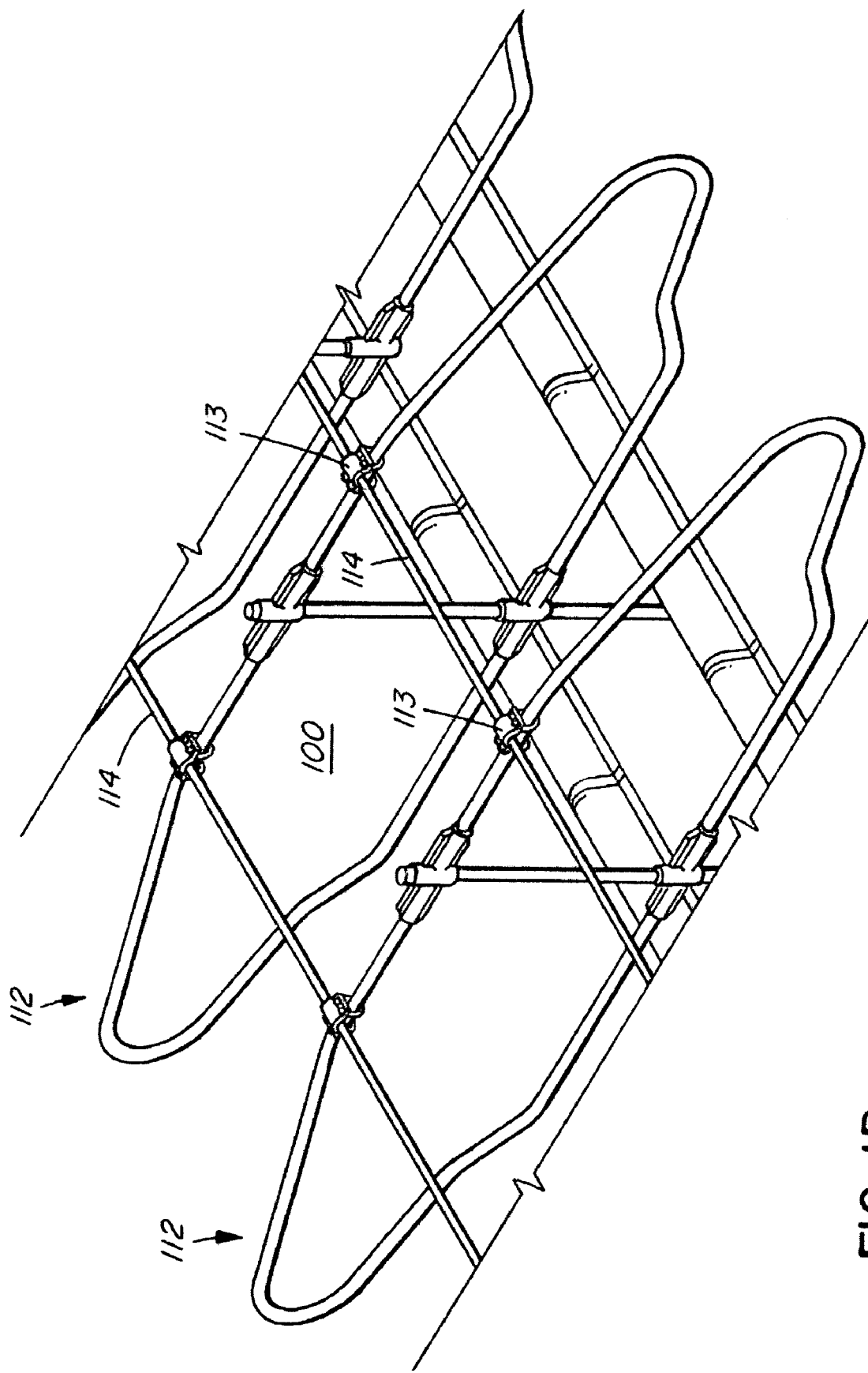
FIG. 1B is an enlarged isometric view of the cattle handling stall installation of FIG. 1A showing the components in greater detail.
Figure 1C:
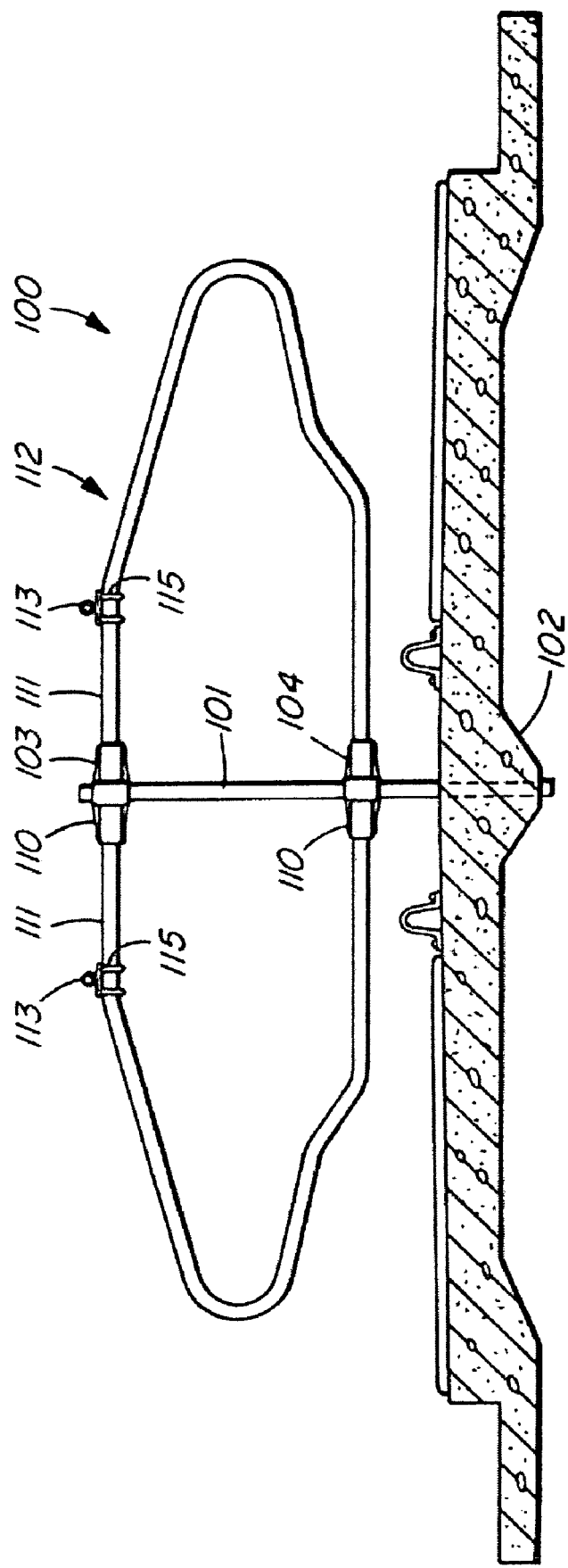
FIG. 1C is a side diagrammatic view of a single stall installation of the cattle handling system of FIGS. 1A and 1B.

Referring now to the drawings, a cattle handling system according to the prior art is shown generally at 100 in FIGS. 1A, 1B and 1C. The system 100 includes a plurality of metallic posts 101 (FIG. 1C) which are embedded in a concrete slab 102 at the time of pouring the concrete for the slab 102. The metallic posts 101 extend generally vertically out of the concrete slab 102. Upper and lower brackets 103, 104, respectively, are mounted to the posts 101 as illustrated. The brackets 103, 104 have cylindrical members 110 mounted thereto which cylindrical members 110 extend generally horizontally and which are adapted to receive the round tubing 111 of the actual stall dividers generally illustrated at 112. Longitudinal reinforcing members 113 on each side of the longitudinal axis 116 of the slab 102 are positioned on brackets 115 attached to the stall dividers 112. The reinforcing members 113 serve to reinforce the stall dividers 112 and also to prevent the inward movement of the cattle when the cattle enter the stalls.

From the prior art technique illustrated in respect of FIGS. 1A through 1C, the disadvantages of the installation become apparent. First, the posts 101 must be embedded in the concrete which is done appropriately only when the concrete is being poured. The concrete contractor may have no experience in installing such posts while the concrete is being poured and, in any event, additional manpower is necessary. Further, positioning the posts 101 vertically which is important for the eventual proper installation of the stall dividers 112 is difficult to do when the concrete is being poured. The posts 101 must be maintained in their desired position during the pouring and the pouring of the wet concrete can exert a destabilizing force on the posts 101 during this period. Following the proper installation of the posts 101 in the slab 102, the installation of the stall dividers 112 is generally a two man operation. The first man holds the stall divider 112 and the second man arranges and positions the brackets 103, 104 while guiding the ends of the stall dividers 112 into the receptacles associated with the brackets 103, 104. Following the completed installation, the posts 101 are vulnerable to damage by the movement of the large animals, namely cows, which brush the stall dividers 112 and/or posts 101 associated with the stall dividers 112. Likewise, the posts 101 potentially interfere with the movement and thereby affect the comfort of the cows.

Figure 2A:
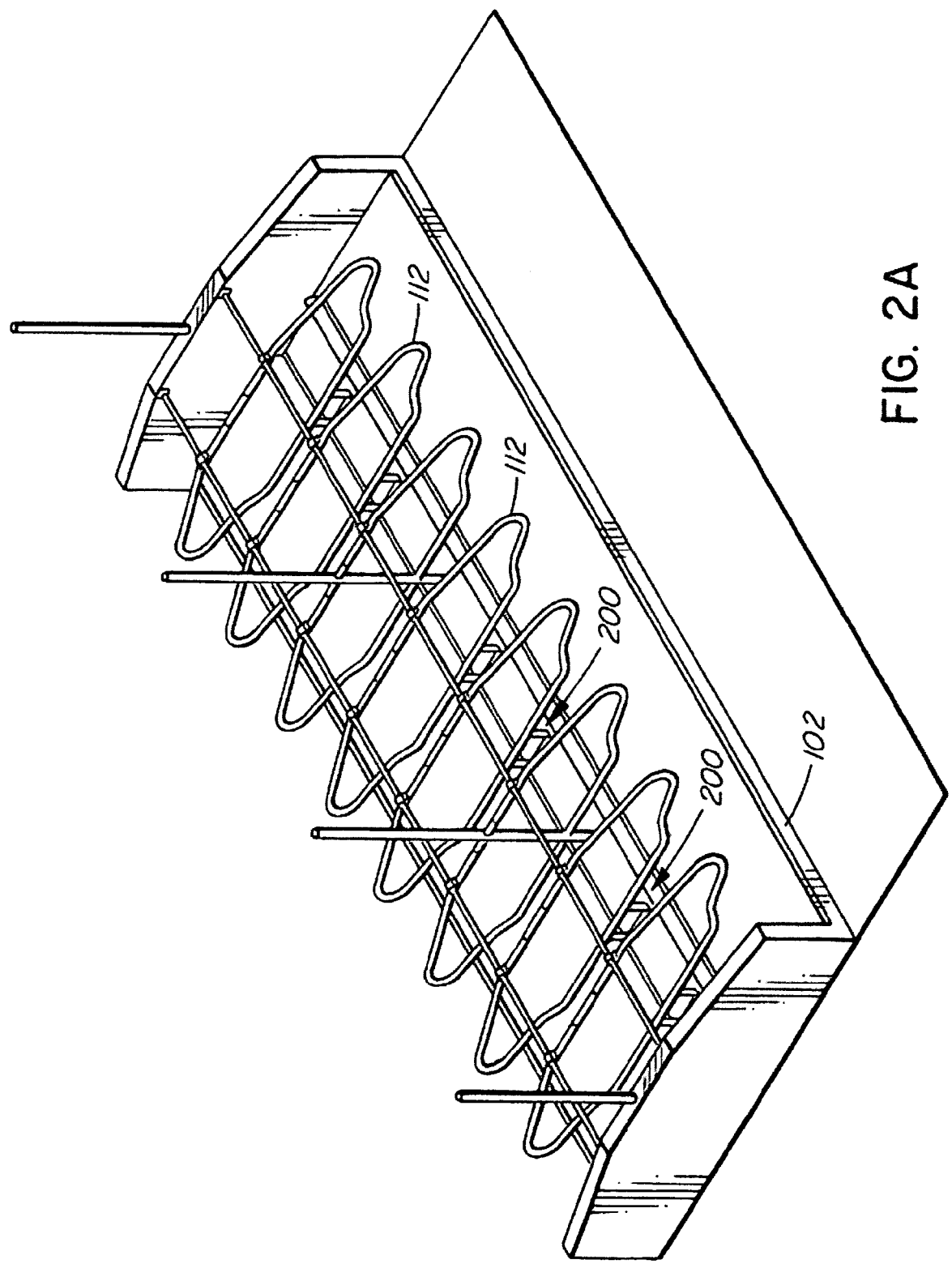
FIG. 2A is a diagrammatic isometric view of the cattle handling system which includes the apparatus according to the present invention.
Figure 2B:
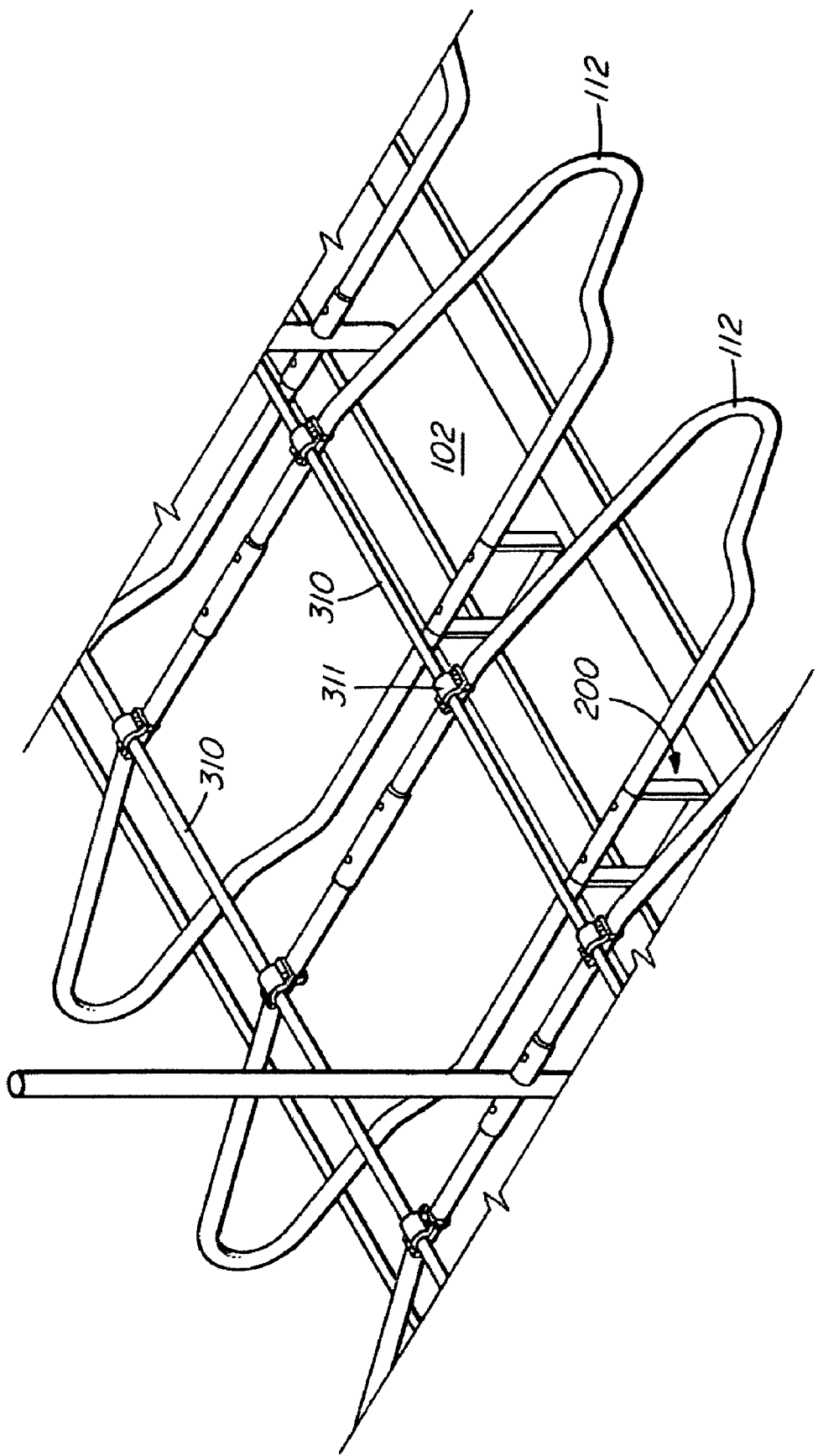
FIG. 2B is an enlarged isometric view of a portion of FIG. 2A particularly illustrating various of the components in greater detail.
Figure 4B:
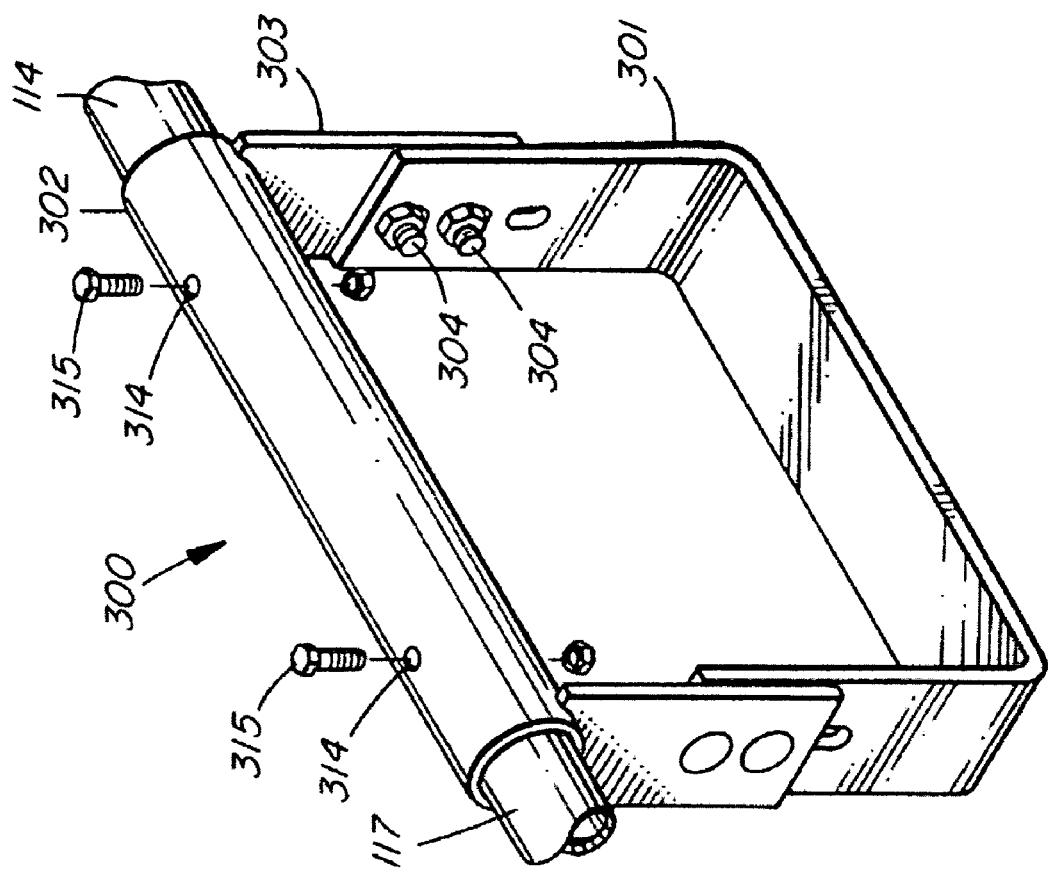
FIG. 4B is a diagrammatic isometric view of a second stall base bracket assembly according to a further aspect of the invention.
Figure 4A:
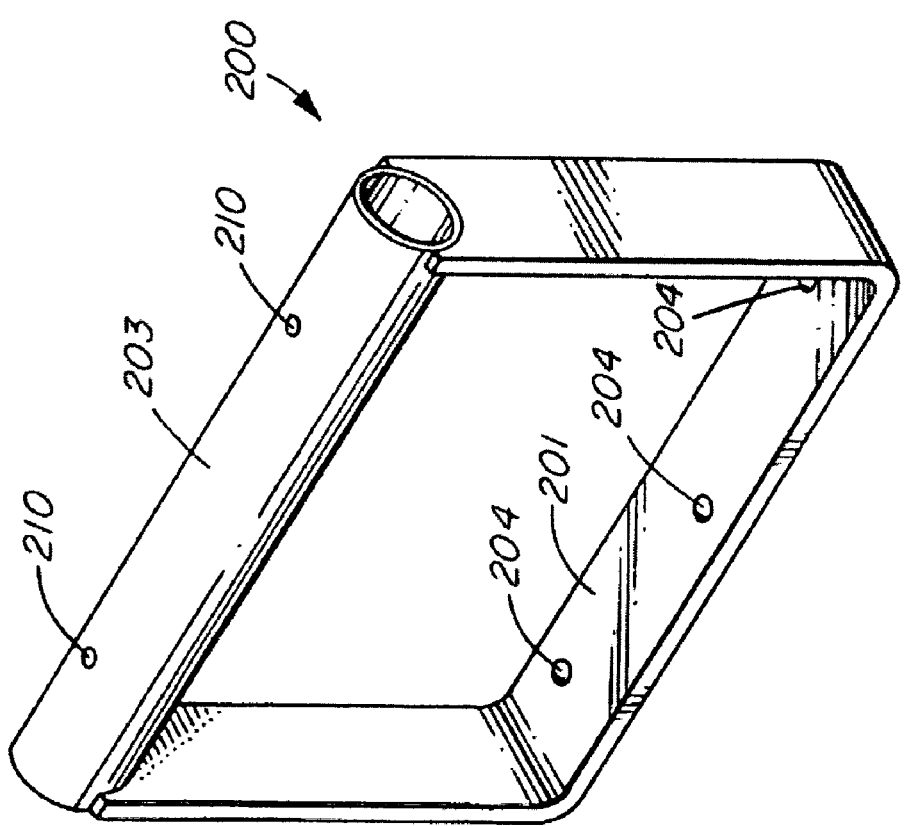
FIG. 4A is a diagrammatic isometric view of a first stall base bracket assembly according to one aspect of the invention.

Referring now to FIGS. 2A and 2B, a stall base floor mounted bracket according to a first embodiment of the invention is generally illustrated at 200 and is illustrated in greater detail in FIG. 4A. The bracket 200 has a first lower member 201 for attaching to the concrete slab 102 as will be described. An upper member 203 which comprises a cylindrical metal member is connected to the lower member 201 as by welding. The upper member 203 is used as a female receiving member for receiving an end of each of the stall dividers 112 as will be described.

Lower member 201 has three (3) holes 204 comprising a central hole and two side holes. The holes 204 are used for securing the floor mounted bracket 200 to the concrete slab 102 in its desired installation position as also will be described. Upper member 203 has two holes 210 extending therethrough. Holes 210 in upper member 203 are used for the purpose of holding the stall dividers in the desired position during the installation process also as will be described.

A stall base floor mounted bracket according to a further aspect of the invention is generally illustrated at 300 in FIG. 4B. This bracket 300 is similar to the bracket 200 of FIG. 4A but in addition to the lower member 301 and upper member 302, an adjustment member 303 is provided to allow for the vertical adjustment of upper member 302 relative to lower member 301 by moving adjustment member 303 up or down relative to the lower member 301. This vertical adjustment will allow the stall dividers 112 to be vertically adjusted relative to the concrete slab 102 on which the brackets 300 are installed. The concrete slab 102 is not perfectly horizontal throughout its length and by raising or lowering each of the stall dividers 112, a more consistent and uniform installation will be obtained. Similarly, the vertical adjustment of the brackets 300 will allow for raising or lowering the stall dividers 112 to allow for cows of different sizes. Mounting holes (not shown) are located in the lower member 301 similar to the mounting holes 204 in the bracket 200 of FIG. 4A. Bolts 304 are provided for securing the adjustment member 303 to the lower member 301 in its desired configuration on the floor mounted bracket 300.

Figure 3A:
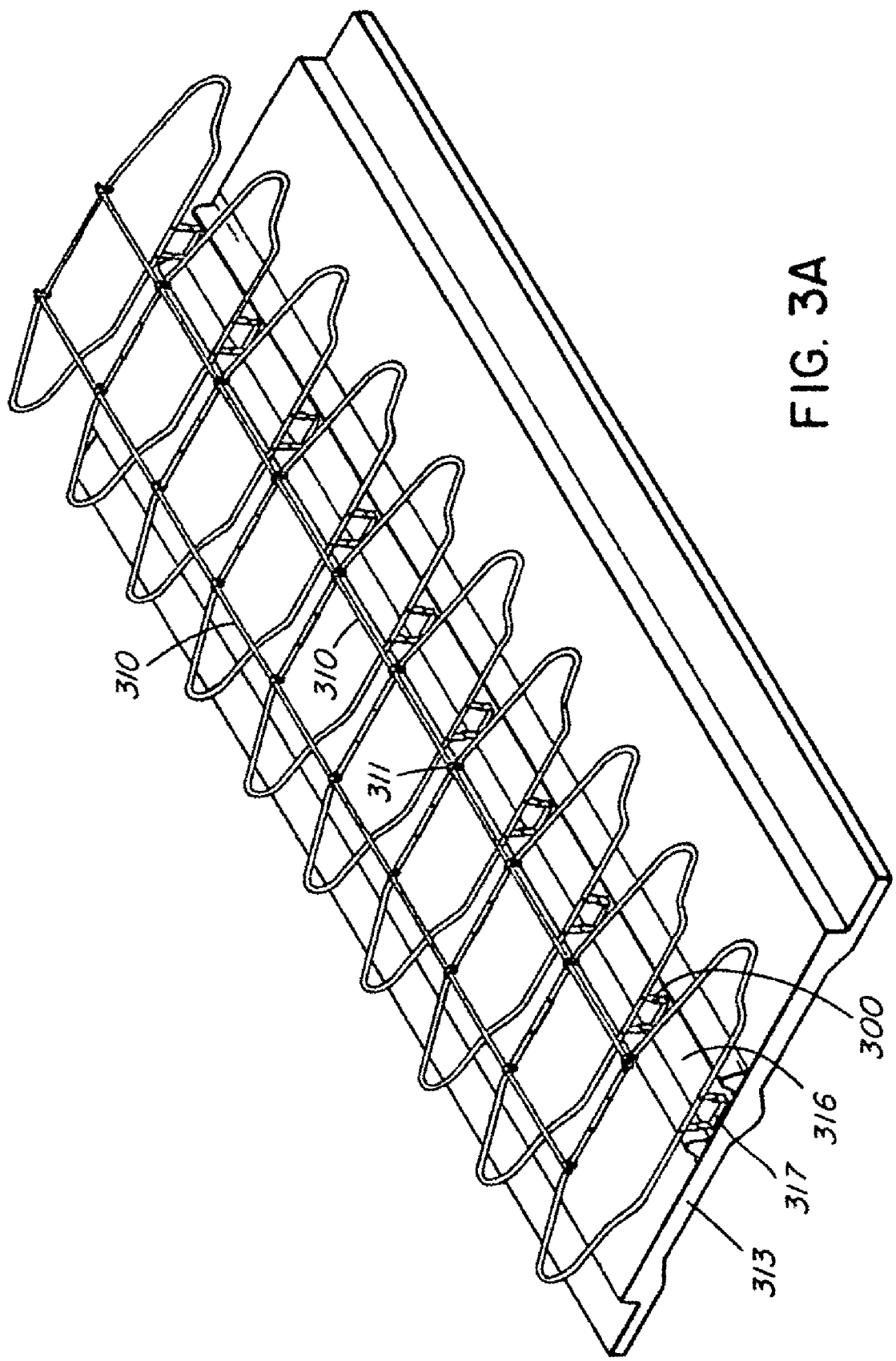
FIG. 3A is a diagrammatic isometric view of the cattle handling system of FIGS. 2A and 2B according to a further embodiment of the invention.
Figure 3B:
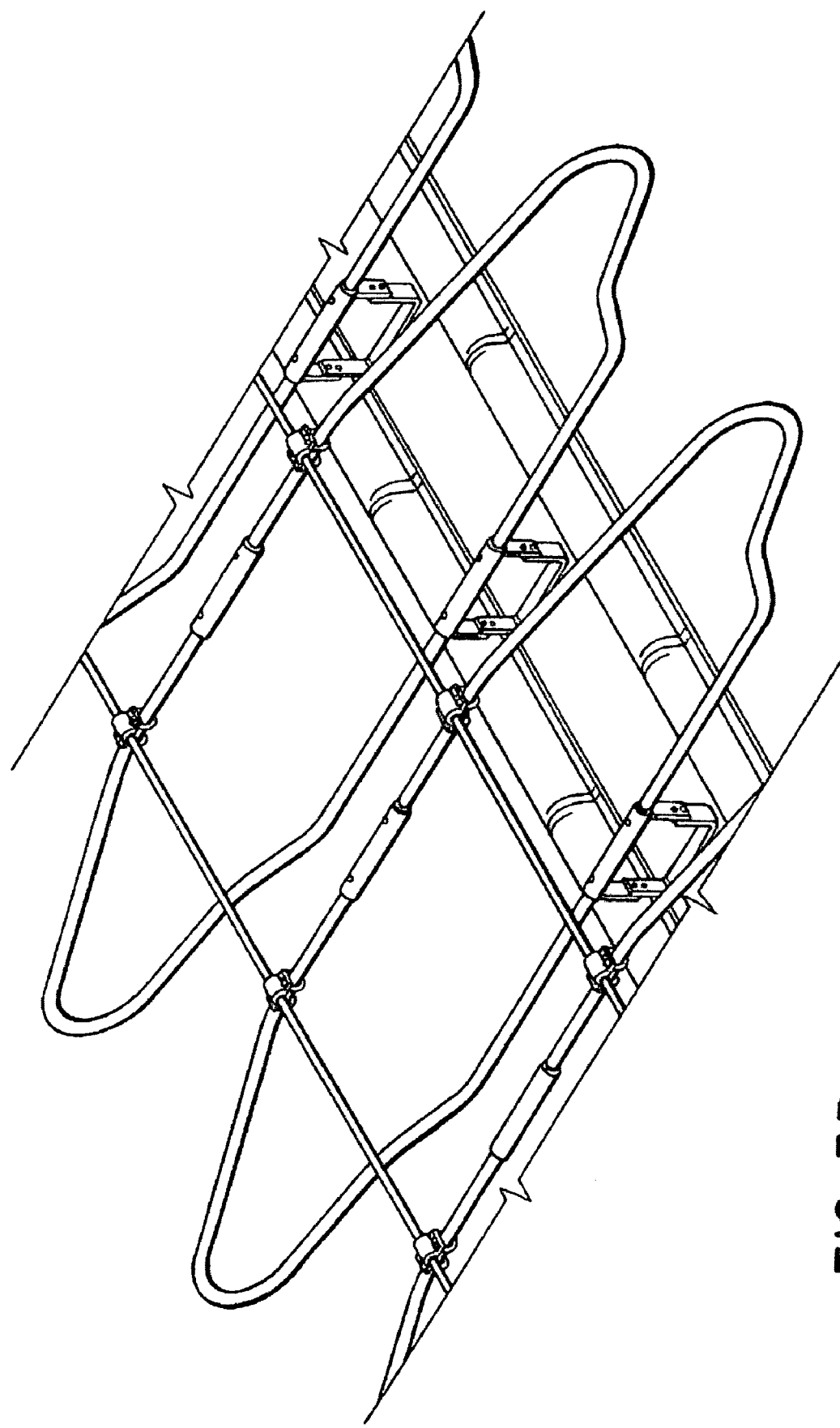
FIG. 3B is an enlarged isometric view of a portion of FIG. 3A particularly illustrating various of the components in greater detail.
Figure 3C:
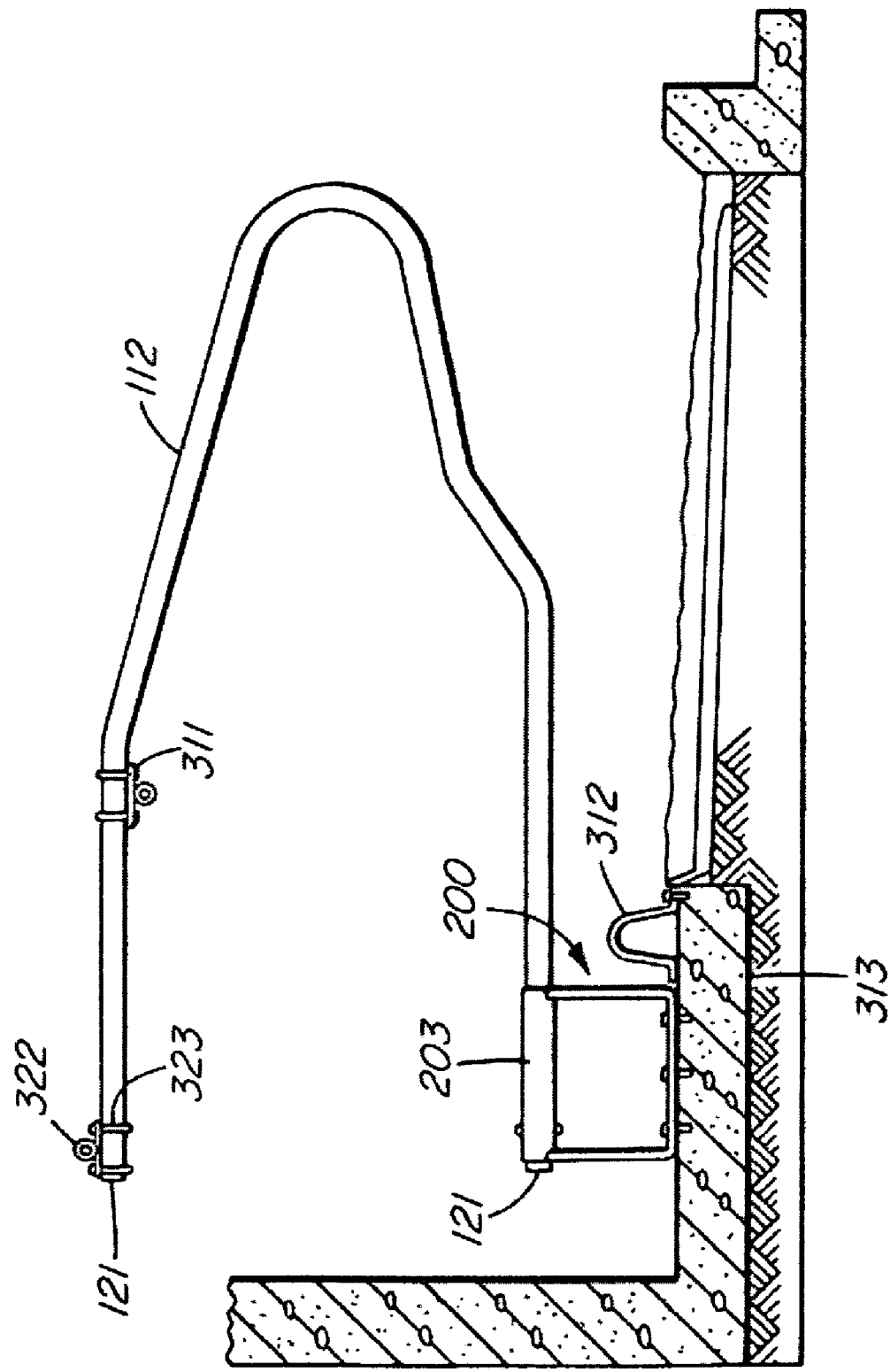
FIG. 3C is a side view of the apparatus according to the invention in a single row type installation.
Figure 5:
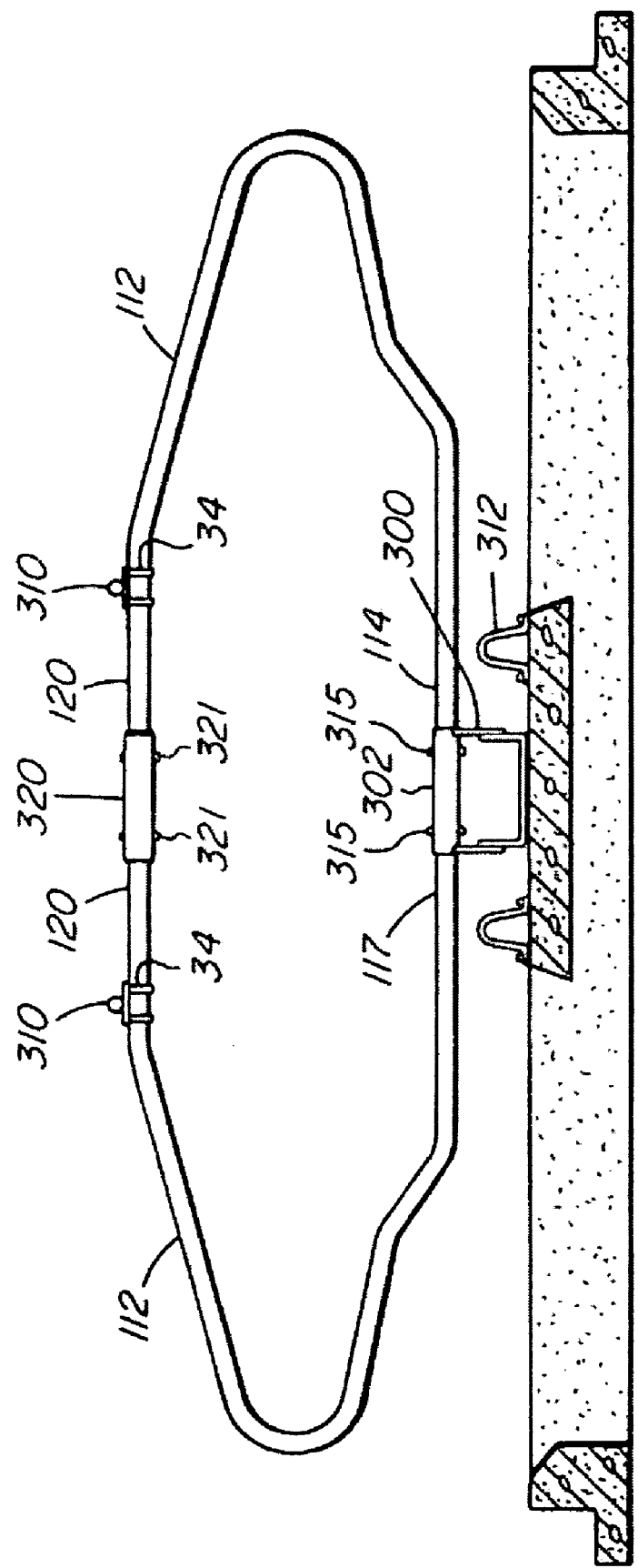
FIG. 5 is a side view of the apparatus according to the invention similar to FIG. 3C but in a head to head type installation configuration.
Figure 6B:
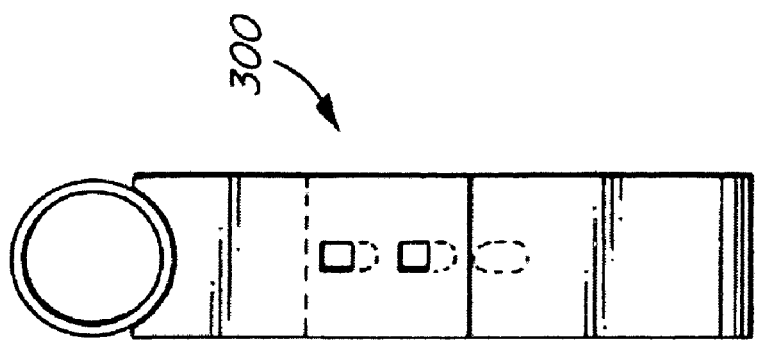
FIGS. 6A and 6B are front and side views, respectively, of the adjustable stall base bracket assembly according to a further aspect of the invention.
Figure 6A:
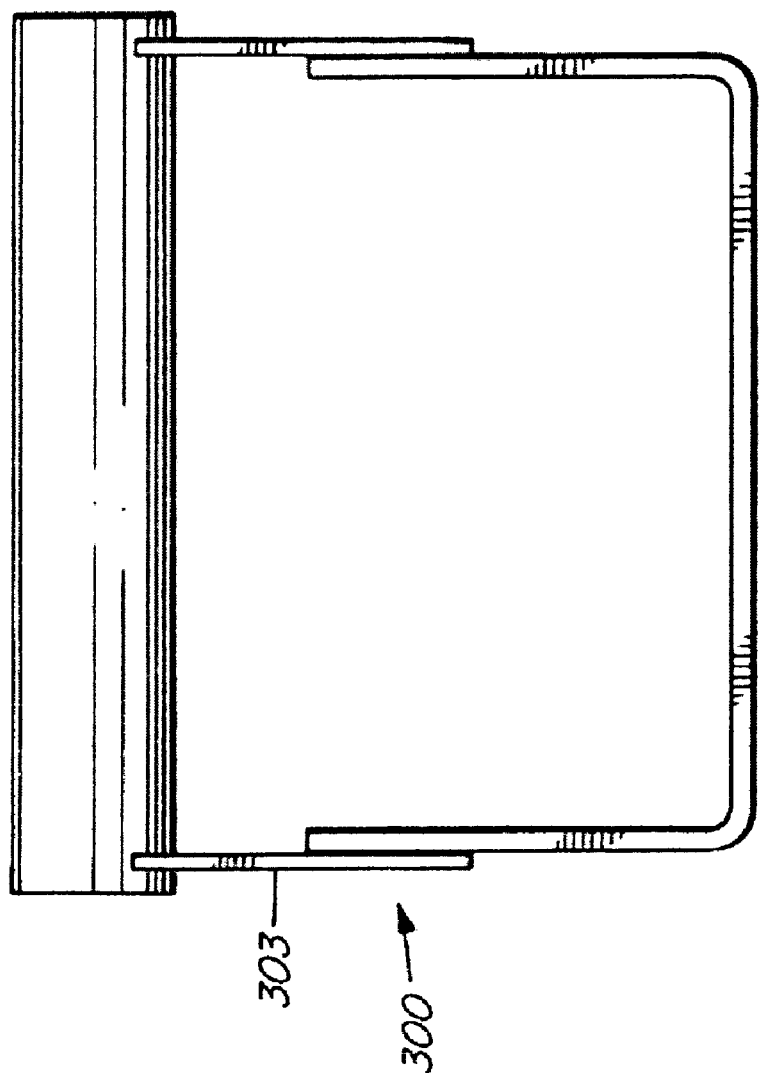

Two configurations of the installed stall dividers 112 are shown in FIGS. 3C and 5, respectively. FIG. 3C illustrates the stall divider 112 in a single row application; that is, only one row of cows is intended to be separated by the stall dividers 112 after installation according to FIG. 3C. FIG. 5 illustrates the configuration where a head to head application is intended; that is, cows can enter the stalls delineated by the stall dividers 112 from both the right and left hand sides and face each other head to head after entry. The cows in each row are separated by the stall dividers 112 and are restricted from entering too deep into the stalls by the longitudinal reinforcing members 310 (FIG. 2B) connected to the stall dividers 112 by brackets 311.

The longitudinal members 310 thereby allow for reinforcement of the stall dividers 113 and for convenient disposal of manure which results from the cows after their entry into the stall dividers 112. Inverted U-shaped members 312 known as POLLY PILLOWS (Trademark) and made from brisket board or like material, may be installed in the concrete 313 to properly position the cows when resting. It is uncomfortable for cows to lie on the members 312. Accordingly, the cows will generally lie down outside the members 312 and between the stall dividers 112 in their preferred resting positions.

A floor mount jig used for the proper installation of the brackets 200 (FIG. 4A) and 300 (FIG. 4B) is generally illustrated at 400 in FIGS. 7A and 7B. The jig 400 has a first jig member 401 and a second jig member 402 which telescopes into the first jig member 401 and thereby provides for an adjustable length "D" between the holes 410 as noted in FIG. 7A and as will be described. The adjustable length is determined by the distance between the stall dividers 112 and the brackets 200, 300 as the farmer, the dealer, or the size of the cows may determine. A pair of end members 403, 404 are connected to first and second jig members 401, 402, respectively, as by welding, for example. Each of the end members 403, 404 have three (3) holes drilled therethrough. Center holes 410 are used for locating the longitudinal positions between the brackets 200, 300 and therefore the positions of the stall dividers 112. Holes 411 are used for establishing the vertical positions of the brackets 200 (FIG. 4A) and 300 (FIG. 4B) about holes 410 thereby to ensure that the stall dividers 112 extend parallel to each other and perpendicular to the centerline or longitudinal axis 413 which extends between the holes 410 in jig 400, all as will be explained.

OPERATION

In operation and with initial reference to FIG. 3A, it will be assumed that the concrete slab 313 has been poured and has dried. It is now desired to provide the correct installation position for the brackets 200, 300.

A chalk line 316 indicating the longitudinal or center axis of the concrete slab 313 will be dropped on the slab 313. The line 316 will, of course, be straight and will indicate the central mounting positions for the brackets 200, 300; that is, the center ones of holes 204 (FIG. 4A) will all be located on the chalk line 314 when installed.

Following the dropping of the chalk line 316, a plurality of holes 317 (FIG. 3A) are marked and drilled a predetermined distance apart, conveniently a distance of forty eight (48) inches apart on the chalk line 316 although this distance may be varied as desired. Anchor bolts (not shown) are then installed in the drilled holes 317 and, following installation, extend outwardly a short distance from the surface of the concrete slab 102.

The floor mount jig 400 (FIG. 7A) is then used for marking and drilling the remaining holes for brackets 200, 300. Jig 400 is placed with one of the central holes 410 in first end 403 being placed on one of the anchor bolts extending from the first of the drilled holes 317. The second central hole 410 in second end 404 is placed on the adjacent one of the anchor bolts in next drilled hole 317. The outer holes 411 in both first and second ends 403, 404 are then drilled into the slab 102 with the jig 400 in position. The jig 400 is then moved to the next adjacent anchor bolt and the process continues. Thus, when completed, there will be a series of holes located outwardly from the central holes 317, which holes provide for the appropriate installation of the brackets 200, 300, normal or perpendicular to the chalk line 316.

Anchor bolts are then inserted into the drilled holes and serve as the guides for the installation of the brackets 200, 300, as desired. The brackets 200, 300 are placed on the anchor bolts and fastening bolts (not shown) are inserted through the holes 201, 204 in brackets 200, 300, and into the anchor bolts. Tightening the bolts provides for secure installation of the brackets 200, 300 in a position wherein the stall dividers 112 extend perpendicular to the center line or longitudinal axis 316 (FIG. 3A), 413 (FIG. 7A) following their installation in the brackets 200, 300. Instead of anchor bolts, an epoxy bonding agent to maintain the anchors within their holes may conveniently be used.

Vertical adjustment of the brackets 300 (FIG. 4B) is provided by removal of the bolts 304 and movement of the third or adjustment member 303 relative to the first or lower member 301. This vertical adjustment may allow for different sized cows and for ensuring the stall dividers 112 assume a consistent height throughout the installation as the upper surface of the concrete slab 313 may not be perfectly uniform throughout its length.

Following the installation of the brackets 300 on the concrete slab 102, the stall dividers 112 (FIG. 5) are each manipulated by a user placing a first end 114 of the stall divider 112 into the upper member 302 of the bracket 300 as is also illustrated in FIG. 4B. The first end 114 of stall divider 112 has holes (not illustrated) which are intended to match the holes 314 of the cylindrical or upper member 302 when the proper insertion depth of first end 114 into upper member 302 is reached. A pin or bolt 315 is then dropped into hole 314 of upper member 302 and matching hole in first end 114 and the stall divider may then be released by the user manipulating the stall divider 112 which will then be held in a generally vertical position.

The opposite or leftwardly located stall divider 112 (FIG. 5) will then be similarly installed; that is, the end 117 will be likewise installed by the user into the cylindrical or upper member 302 and a bolt or pin 315 is dropped through the leftwardly located holes 314 in both the upper member 302 and the end 114 of stall divider 112 (FIG. 4B). The two (2) stall dividers 112 will then be assuming a generally vertical configuration and will stand alone within the upper member 302 of bracket 300.

The user will then select a closing sleeve 320 (FIG. 5). Each upper end 120 of the stall dividers 112 is inserted into the closing sleeve 320 and a bolt 321 is inserted through complementary holes in the closing sleeve 320 and the upper ends 120 of the stall dividers 112. All of the bolts may then be tightened to secure the installation. Longitudinal reinforcing members 310 are then installed between the stall dividers (FIG. 2B) with complementary brackets 311 attached to the stall dividers 112. The reinforcing members 310 provide for the reinforcement of the stall dividers 112 and serve a second purpose in limiting inwardly movement of the cows when they enter the stalls defined by the stall dividers 112.

Following the installation of all the brackets 300, and the installation of the stall dividers 112 within the brackets 300, the assembly is surveyed by sight or otherwise. If a vertical adjustment of the stall dividers 112 is desired, the adjustment members 303 of the brackets 300 may be moved vertically by removing bolts 304 and selecting a new configuration wherein the stall dividers 112 all appear to be in their correct positions along the longitudinal distance of the concrete slab 102. Slotted adjustment holes in brackets 300 may also provide for adjustment for accommodating the differences in concrete elevation that may result from a poor concrete pour or inconsistent surface height along the slab 102.

In the event a single row application is desired, reference is made to FIG. 3C. In this configuration, the stall dividers 112 are installed in only one side of the upper member 203 of bracket 200 as is illustrated. Since the free ends 121 of the stall dividers 112 lack total stability in this configuration, it is convenient to provide additional reinforcing members 322 extending between the free ends 121 of each of the stall dividers 112 which reinforcing members 322 are secured by appropriate brackets 323 so that the structural integrity of the apparatus is enhanced.

While specific embodiments of the invention have been described, such embodiments are illustrative of the invention only and should not be taken as limiting its scope. Many modifications will readily occur to those skilled in the art to which the invention relates and the invention, therefore, should be construed only in accordance with the accompanying claims.

We claim:

1. Bracket used for installing a cattle stall divider in a barn or shelter which cattle stall divider extends generally horizontally and longitudinally and which acts as a divider for positioning an animal on each side of said cattle stall divider, said bracket comprising a first generally horizontal member for attachment to a slab or foundation within said barn or shelter and a second member associated with said first member, said second member being located above said first member, said second member being generally parallel to said first member, said first member and said second member having a generally parallel configuration within a substantially vertical plane extending through said first and second members, said first member and said second member having a relatively narrow configuration, said second member having an attachment area with means to allow the connection of a third member to said bracket which third member forms part of said cattle stall divider.

2. Bracket as in claim 1 and further comprising a fourth member between said first and second members, said fourth member allowing horizontal adjustment of said divider.

3. Bracket as in claim 2 wherein said slab or foundation has a generally horizontal surface and said first member is attachable to said surface.

4. Bracket as in claim 2 wherein said first member is embedded in said slab or foundation.

5. Bracket as in claim 2 wherein said first member is attached to said surface of said slab or foundation by bolts.

6. Bracket as in claim 2 and further comprising a fifth member, said fifth member being a further divider, both of said dividers being connected to said second member.

7. Bracket as in claim 6 wherein said second member is tubular and both said dividers are inserted into said tubular.

8. Bracket used for installing a cattle stall divider, said bracket comprising a first generally horizontal member for attachment to a slab or foundation and a second member associated with said first member, said second member being located above said first member and being generally parallel to said first member in a generally vertically extending plane, said second member having an attachment to allow the connection of a third member, said first member and said second member having a relatively narrow configuration.

9. Bracket as in claim 8 and further comprising a fourth member between said first and second members, said fourth member allowing adjustment of the distance between said first and second members.

10. Bracket as in claim 9 wherein said slab or foundation has a surface and said first member is attachable to said surface.

11. Bracket as in claim 9 wherein said first member is embedded in said slab or foundation.

12. Bracket as in claim 10 wherein said first member is attached to said surface of said slab or foundation by bolts.

13. Bracket as in claim 9 and further comprising a fifth member being a first stall divider, said first stall divider and a third member being a second stall divider, said first and second stall dividers each being connected to said second member.

14. Bracket as in claim 13 wherein said second member is tubular and said third and fifth members are inserted into said tubular.

\* \* \* \* \*